(12) United States Patent
Swanson

(10) Patent No.: US 10,120,884 B2
(45) Date of Patent: Nov. 6, 2018

(54) CHOREOGRAPHING AUTOMATED AND MANUAL PROCESSES IN SUPPORT OF MOSAIC GENERATION

(71) Applicant: DIGITALGLOBE, INC., Longmont, CO (US)

(72) Inventor: Nathan Swanson, Erie, CO (US)

(73) Assignee: DigitalGlobe, Inc., Westminster, CO (US)

( * ) Notice: Subject to any disclaimer, the term of this patent is extended or adjusted under 35 U.S.C. 154(b) by 90 days.

(21) Appl. No.: 15/228,954

(22) Filed: Aug. 4, 2016

(65) Prior Publication Data

US 2017/0041550 A1 Feb. 9, 2017

Related U.S. Application Data

(60) Provisional application No. 62/201,968, filed on Aug. 6, 2015.

(51) Int. Cl.
| | | |
|---|---|---|
| *G06F 17/30* | (2006.01) | |
| *H04N 5/232* | (2006.01) | |
| *G06T 3/40* | (2006.01) | |
| *H04N 1/387* | (2006.01) | |
| *H04N 5/77* | (2006.01) | |
| *H04N 1/60* | (2006.01) | |

(52) U.S. Cl.
CPC ........ *G06F 17/3028* (2013.01); *G06T 3/4038* (2013.01); *H04N 1/3876* (2013.01); *H04N 5/23238* (2013.01); *H04N 5/77* (2013.01); *G06T 2207/10032* (2013.01); *H04N 1/6027* (2013.01)

(58) Field of Classification Search
CPC .......... G06F 17/3028; G06F 17/30241; H04N 5/23238; H04N 1/3876; H04N 5/77; H04N 1/6027; G06T 3/4038; G06T 2207/10032
See application file for complete search history.

(56) References Cited

U.S. PATENT DOCUMENTS

| 6,075,905 A | 6/2000 | Herman et al. | |
|---|---|---|---|
| 6,633,685 B1* | 10/2003 | Kusama | G06F 17/3025 345/629 |
| 6,850,184 B1 | 2/2005 | Desrochers et al. | |
| 2010/0142814 A1* | 6/2010 | Damkjer | G06T 5/009 382/167 |
| 2010/0142842 A1 | 6/2010 | Damkjer et al. | |
| 2014/0184851 A1* | 7/2014 | Nakasugi | H04N 5/265 348/239 |
| 2014/0267390 A1* | 9/2014 | Padwick | G06T 11/00 345/629 |
| 2014/0354828 A1* | 12/2014 | Rubinstein | G06T 3/0068 348/187 |

FOREIGN PATENT DOCUMENTS

WO 2008028040 A2 3/2008

OTHER PUBLICATIONS

International Search Report, PCT Application PCT/US2016/045635, dated Nov. 14, 2016.
Extended European Search Report for EP Patent Application No. 16833897.8, dated Mar. 18, 2018.

* cited by examiner

*Primary Examiner* — Albert Cutler
(74) *Attorney, Agent, or Firm* — Marsh Fischmann & Breyfogle LLP

(57) ABSTRACT

A database for creating orthomosaics, where the database is tailored to retrieve the most recent imagery for each pixel, in an efficient manner that partitions the orthomosaic into sufficiently small chunks that can each be quickly processed.

14 Claims, 19 Drawing Sheets

Warping processing

CHOREOGRAPHING AUTOMATED AND MANUAL PROCESSES IN SUPPORT OF MOSAIC GENERATION

CROSS REFERENCE TO RELATED APPLICATIONS

This application claims the benefit of U.S. Provisional Application No. 62/201,968, filed Aug. 6, 2015, the entire contents of which are incorporated herein by reference.

BACKGROUND

High resolution images of selected portions of a celestial body's surface have become a product desired and used by government agencies, corporations, and individuals. For instance, many consumer products in common use today include images of the Earth's surface, such as Google® Earth. Various types of remote sensing image collection platforms may be employed, including aircraft, earth-orbiting satellites, and the like.

In the case of a consumer digital camera, for instance, an image sensor is generally arranged in an area array (e.g., 3,000 rows of 3,000 pixels each, or 9,000,000 total pixels) which collects the image area in a single "snapshot." However, satellite-based imaging often functions on the "push-broom scanning" principle whereby each image sensor includes a relatively small number of rows (e.g., a couple) of a great number of pixels (e.g., 50,000) in each row. Each row of pixels is scanned across the earth to build an image line by line, and the width of the image is the product of the number of pixels in the row times the pixel size or resolution (e.g., 50,000 pixels at 0.5 meter ground resolution produces an image that is 25,000 meters wide). The length of the image is controlled by the scan duration (i.e. number of lines), which is typically settable for each image collected. The resolution of satellite images varies depending on factors such as the particular instrumentation utilized, the altitude of the satellite's orbit, and the like.

To allow for the extraction of additional information from the radiance received at a satellite after being reflected from the Earth's surface (which may include atmospheric effects such as from aerosols, clouds, etc.), multi-spectral imaging may be employed. Specifically, multi-spectral imaging captures image data at specific frequencies or wavelengths across the electromagnetic spectrum, including those in the visible light range as well as those beyond or outside of the visible light range (e.g., near infrared (NIR), short wave infrared (SWIR), far infrared (FIR), etc.). For instance, a satellite may have one image sensor (e.g., radiometer) that is sensitive to wavelengths (e.g., high resolution data) across only a first spectral band (e.g., the visible light band, 0.38-0.75 µm) in addition to one or more additional image sensors that are sensitive to wavelengths only across other spectral bands (e.g., NIR, 0.75-1.4 µm; SWIR, 1.4-3 µm; etc.).

Due to the nature of image acquisition, a number of geospatial images may be pieced together to form an orthomosaic of a collection of geospatial images that cover a larger geographic area than may be feasibly covered with a single acquired image. In this regard, it may be appreciated that the images that form such an orthomosaic may be acquired at different times or may be acquired using different collection techniques or parameters. In situations where more than one image is available for a given region of interest on the ground, it may be desirable to use the most recent image. Various artifacts can be introduced when multiple separate images are combined into an orthomosaic.

Up until recently, orthomosaic generation has always included manual selection of images by a human operator. Generally, the human operator is tasked with reviewing all available images for an area of interest and choosing images for inclusion in the orthomosaic utilizing what the human operator subjectively determines to be the "best" source images. The subjective determinations of the human operator are often guided by a principle that it is preferential to include as few images in the orthomosaic as possible. In turn, an orthomosaic may be generated utilizing the human-selected images to form the orthomosaic. As may be appreciated, this human operator-centric process may be time consuming and costly. Moreover, the image selection is subjective to the human user.

It is against this background that the techniques disclosed herein have been developed.

SUMMARY

Disclosed is a system for automatically generating orthomosaic images. The system includes an image storage repository and a processor operating on computer instructions to implement a plurality of separate services and a service bus to pass requests and data between various ones of the plurality of services, wherein the services include at least a mosaic generation service, a cutline service, and a tonal balancing service. The mosaic generation service obtains images from the repository, requests and obtains cutlines from the cutline service, requests and obtains tonal balancing results from the tonal balancing service, and generates an orthomosaic image therefrom.

The services may also include an image warping service. The system may further include a user interface that allows a user to provide feedback to the system about the orthomosaic image being generated. The image storage repository may include a plurality of images captured at different times, so that each image has a capture time associated therewith; wherein the services further include a database that divides up the orthomosaic image to be generated into a plurality of subimages which are each processed separately, and wherein the database selects image data that has the most recent capture time when available for a given portion of the orthomosaic image, and when not available for a given portion of the orthomosaic image, the database selects image data that has the next most recent capture time. The database may not be a Postgres database. Generating the orthomosaic image may include creating a map of which image to use to provide the image data for each pixel in the orthomosaic. The map may be created in part by using a rule of using the most recent imagery where possible.

Also disclosed is a system for automatically generating orthomosaic images, which includes an image storage repository and a processor operating on computer instructions to implement a plurality of separate services and a service bus to pass requests and data between various ones of the plurality of services, wherein the services include at least a mosaic generation service, a cutline service, and a tonal balancing service. The mosaic generation service obtains images from the repository, requests and obtains cutlines from the cutline service, requests and obtains tonal balancing results from the tonal balancing service, and generates an orthomosaic image therefrom. The image storage repository includes a plurality of images captured at different times, so that each image has a capture time associated therewith. The services further include a database that divides up the orthomosaic image to be generated into a plurality of subimages which are each processed separately, and wherein the database selects image data that has the most recent capture time when available for a given portion of the orthomosaic image, and when not available for a given portion of the orthomosaic image, the database selects image data that has the next most recent capture time.

The services may also include an image warping service. The system may further include a user interface that allows a user to provide feedback to the system about the orthomosaic image being generated. The database may not be a Postgres database. Generating the orthomosaic image may include creating a map of which image to use to provide the image data for each pixel in the orthomosaic. The map may be created in part by using a rule of using the most recent imagery where possible.

Also disclosed is a system for automatically generating orthomosaic images, which includes an image storage repository, a processor operating on computer instructions to implement a plurality of separate services and a service bus to pass requests and data between various ones of the plurality of services, wherein the services include at least a mosaic generation service, a cutline service, a tonal balancing service, and an image warping service, and a user interface that allows a user to provide feedback to the system about the orthomosaic image being generated. The mosaic generation service obtains images from the repository, requests and obtains cutlines from the cutline service, requests and obtains tonal balancing results from the tonal balancing service, and generates an orthomosaic image therefrom. The image storage repository includes a plurality of images captured at different times, so that each image has a capture time associated therewith. The services further include a database that divides up the orthomosaic image to be generated into a plurality of subimages which are each processed separately, and wherein the database selects image data that has the most recent capture time when available for a given portion of the orthomosaic image, and when not available for a given portion of the orthomosaic image, the database selects image data that has the next most recent capture time.

The database may not be a Postgres database. Generating the orthomosaic image may include creating a map of which image to use to provide the image data for each pixel in the orthomosaic. The map may be created in part by using a rule of using the most recent imagery where possible.

DETAILED DESCRIPTION

Figure 1:
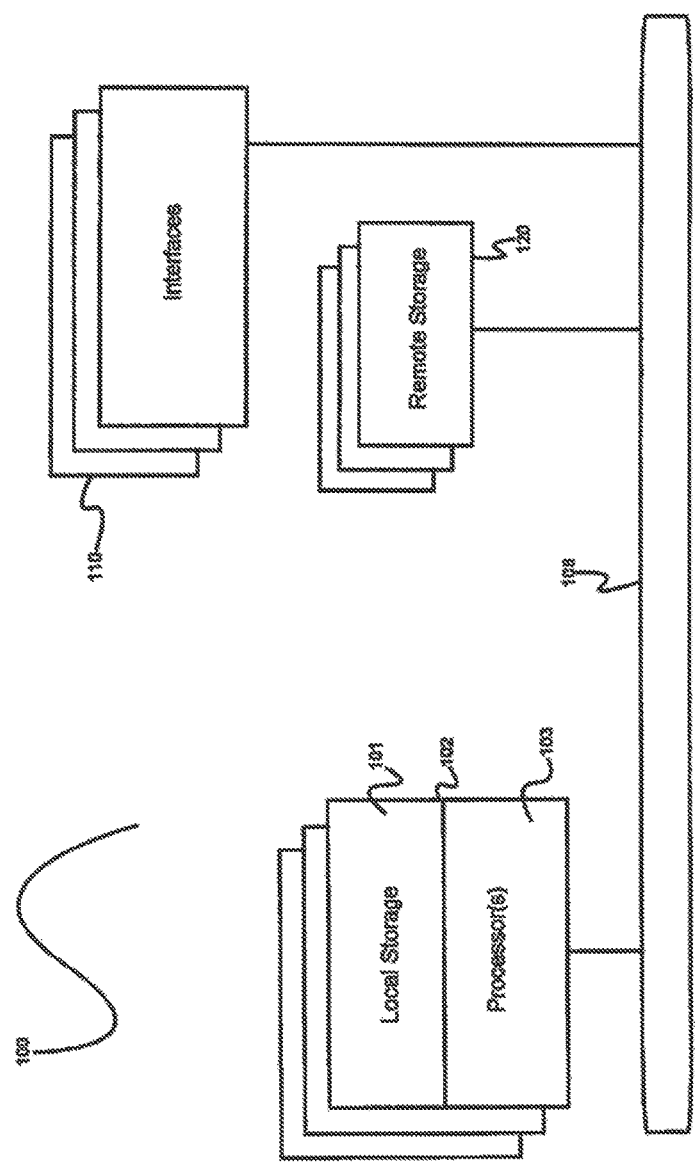
FIG. 1 is a block diagram illustrating an exemplary hardware architecture of a computing device used in an embodiment of the disclosure herein.

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

The present disclosure generally relates to functionality that may be utilized in automatic generation of an orthomosaic that may be generated from a plurality of geospatial images. For example, in an embodiment, the geospatial source images for the orthomosaic may be satellite images acquired using low earth orbit satellites such as QuickBird, WorldView-1, WorldView-2, WorldView-3, IKONOS, GeoEye-1, or GeoEye-2 which are currently operated or proposed for operation by DigitalGlobe, Inc. of Longmont, Colo. However, other geospatial imagery may also be used to generate an orthomosaic as described herein such as for example, other geospatial imagery obtained from satellites other than those previously listed, high altitude aerial photograph, or other appropriate remotely sensed imagery. The images to be selected for inclusion in an orthomosaic may comprise raw image data or pre-processed geospatial images (e.g., that have undergone orthorectification, pan-sharpening, or other processes known in the art that are commonly applied to geospatial imagery).

In any regard, according to the present disclosure, a geospatial orthomosaic comprising a plurality of geospatial images may be generated such that, for example, image source selection occurs automatically (i.e., without requiring a human operators to select images for use in the orthomosaic). In addition, cutlines may be automatically generated for merging a plurality of images such that cutlines defining boundaries between the plurality of merged images are generated to minimize noticeable differences at image interfaces in a merged image (orthomosaic). In this regard, cutlines between images in the orthomosaic may be less perceivable to human observers of the orthomosaic images. Further detail on these and other related techniques is available in U.S. Pat. No. 9,042,674, entitled "AUTOMATED GEOSPATIAL IMAGE MOSAIC GENERATION," U.S. Pat. No. 9,202,259, entitled "AUTOMATED GEOSPATIAL IMAGE MOSAIC GENERATION WITH AUTOMATIC SOURCE SELECTION," U.S. Pat. No. 9,135,505, entitled "AUTOMATED GEOSPATIAL IMAGE MOSAIC GENERATION WITH AUTOMATIC CUTLINE GENERATION," U.S. Pat. No. 9,367,895, entitled "AUTOMATED SLIVER REMOVAL IN ORTHOMOSAIC GENERATION," U.S. Pat. No. 9,396,391, entitled "AUTOMATED GEOSPATIAL IMAGE MOSAIC GENERATION WITH MULTIPLE ZOOM LEVEL SUPPORT," the entire contents of each of which are incorporated by reference in their entirety.

Figure 19:
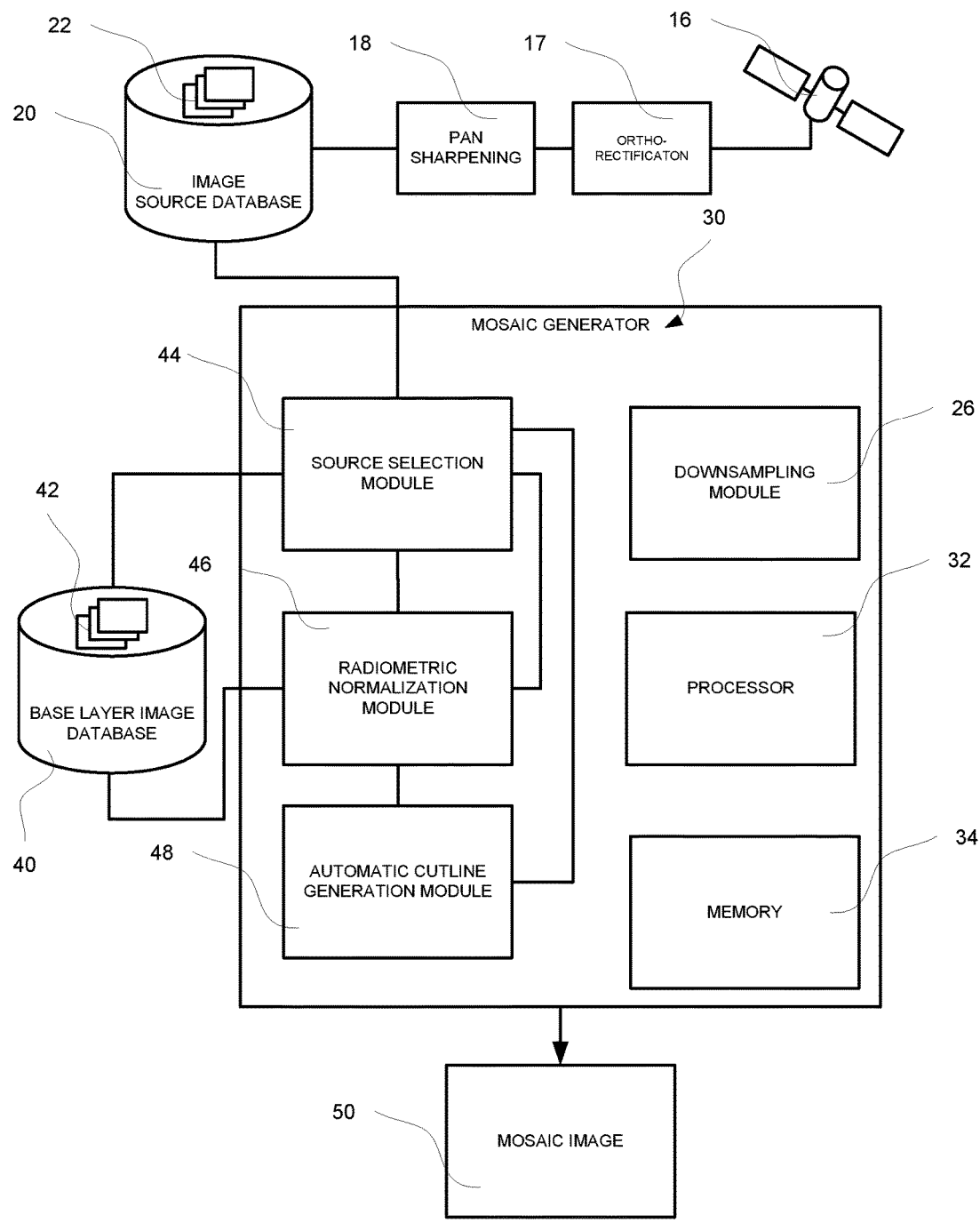
FIG. 19 is a block diagram of an orthomosaic generator.

Accordingly, with respect to FIG. 19, an orthomosaic generator 30 is shown. The orthomosaic generator 30 may include a source selection module 44, an automatic cutline generation module 48, and a radiometric normalization module 46. As may be appreciated, the orthomosaic generator 30, source selection module 44, automatic cutline generation module 48, and radiometric normalization module 46 may include hardware, software, or a combination thereof. For example, the modules 44-48 may each include non-transitory computer readable data comprising computer readable program code stored in a memory 34 of the orthomosaic generator 30. The program code may include instructions for execution of a processor 32 operable to access and execute the code. As such, upon execution of the processor 32 according to the computer readable program code, any or all of the functionality described below with respect to corresponding ones of the modules 44-48 may be provided. Furthermore, while modules 44-48 are shown in a particular order in FIG. 19, it may be appreciated that the modules may be executed in any appropriate order. Furthermore, in some embodiments, only a portion of the modules may be executed. As such, it will be appreciated that the modules may be executed independently or, as will be described herein, in conjunction to produce an orthomosaic.

While FIG. 19 shows a single processor 32 and memory 34, it may be appreciated that the orthomosaic generator 30 may include one or more processors 32 and/or memories 34. For example, a plurality of processors 32 may execute respective ones or combinations of the source selection module 44, automatic cutline generation module 48, and radiometric normalization module 46. Furthermore, it may be appreciated that the orthomosaic generator 30 may be a distributed system such that various ones of the modules 44-48 may be executed remotely by networked processors 32 and/or memories 34. Furthermore, different processes of the modules 44-48 may be executed on different processing units to capitalize on various performance enhancements of the processing units. For example, some processes may be executed on a central processing unit (CPU) while others may be executed by a graphics processing unit (GPU) as will be explained in greater detail below.

The source selection module 44 may be in operative communication with an image source database 20. As mentioned above, the image source database 20 may include raw geospatial images (e.g., corresponding to the direct output of sensor arrays on a satellite 16) or geospatial images that have undergone some amount of pre-processing. For instance, the pre-processing may include orthorectification processes 17 commonly practiced in the art. Additionally or alternatively, the pre-processing may include pan-sharpening 18 as described in U.S. Pat. No. 8,761,506, the entire contents of which are incorporated by reference in its entirety. Other pre-processing techniques may be performed with respect to the geospatial images stored in the image source database 20 without limitation.

The image source database may include one or more geospatial source images 22. As may be appreciated, the geospatial source images 22 may comprise relatively high resolution images. The resolution of images is sometimes referred to herein with a distance measure. This distance measure refers to a corresponding distance on Earth each pixel in the image represents. For example, each pixel in a 15 m image may represent 15 m of width and length on Earth. As such, the geospatial images 22 may include image resolutions of, for example, 0.25 m, 0.5 m, 1 m, 5 m, 15 m, 30 m, or any other suitable resolution.

Further still, the geospatial images 22 may include multiple versions of a single image 22 at different resolutions. For purposes of clarity herein, high resolution and low resolution versions of an image may be discussed. In this regard, a high resolution version of an image described herein may include a reference numeral (e.g., geospatial image 22). A low resolution version of the same image may be described with a single prime designation (e.g., geospatial image 22'). If further resolutions of the same image are referenced, multiple prime (e.g., double prime, triple prime, etc.) reference numerals may be used where the larger the prime designation, the lower the resolution of the image. In this regard, the orthomosaic generator 30 may include a downsampling module 26 that may be operable to downsample an image from a higher resolution to a lower resolution. Any appropriate downsampling technique may be employed to generate one or more different lower resolution versions of a given image. In this regard, any of the modules 44-48 may be in operative communication with a downsampling module 26 to obtain downsampled versions of images as disclosed below. In various embodiments, at least one of the modules 44-48 may include separate downsampling capability such that a separately executed downsampling module 26 is not required.

As shown in FIG. 19, the source selection module 44 may be in operative communication with the image source database 20. As will be described in greater detail below, the source selection module 44 may be operative to analyze a plurality of geospatial images 22 from the image source database 20 to choose selected images 22 or portions of images 22 for inclusion in an orthomosaic image 50.

The source selection module 44 may also be operable to access a base layer image database 40. The base layer image database 40 may include one or more base layer images 42. As will be discussed in greater detail below, the image source selection module 44 may select the images 22 from the image source database 20 at least partially based on a comparison to a corresponding base layer image 42 as will be described below. In this regard, the base layer image(s) 42 may also be geospatial images (e.g., at lower resolutions than the source images 22) that have a known geospatial reference. In this regard, the source images 22 may be correlated to geographically corresponding base layer image (s) 42 such that comparisons are made on geographically concurrent portions of the geospatial source images 22 and base layer image(s) 42.

Upon selection of the images 22 for inclusion in the orthomosaic 50, it may be appreciated that certain portions of at least some of the images 22 may benefit from merging with others of the selected images 22. That is, two selected images 22 may have some region of overlap in the resulting orthomosaic. In this regard, the source selection module 44 may output at least some of the selected images 22 to the automatic cutline generation module 48. As will be described in greater detail below, the automatic cutline generation module 48 may determine appropriate cutlines for merging overlapping selected images 22 to create a merged image.

Additionally, the selected images 22 (e.g., including merged images that are produced by the automatic cutline generator 48) may be output to the radiometric normalization module 46. In this regard, the radiometric normalization module 46 may be operable to perform a radiometric normalization technique on one or more of the selected images 22. In this regard, the radiometric normalization module 46 may also be in operative communication with the base layer image database 40. As will be described in greater detail below, the radiometric normalization module 46 may be operable to perform radiometric normalization at least partially based on a comparison of a selected image 22 to a corresponding base layer image 42 to normalize radiometric properties (e.g., color) of the selected images 22 relative to the base layer image 42. When referencing "color" in the context of radiometric parameters for an image, it may be appreciated that "color" may correspond with one or more intensity values (e.g., a brightness) for each of a plurality of different spectral bands. As such, a "color" image may actually comprise at least three intensity values for each of a red, blue, and green spectral band. Furthermore, in a panchromatic image (i.e., a black and white image), the intensity value may correspond to gray values between black and white. As such, when comparing "color," individual or collective comparison of intensities for one or more spectral bands may be considered. As such, the selected images 22 may be processed by the radiometric normalization module 46 to achieve a more uniform color (e.g., intensities or brightness for one or more spectral bands) for the orthomosaic 50. In turn, an orthomosaic 50 may be automatically and/or autonomously generated by the orthomosaic generator 30 that may be of very high resolution (e.g., a corresponding resolution to the source images 22) that is relatively uniform in color to produce a visually consistent orthomosaic 50.

Figure 4:
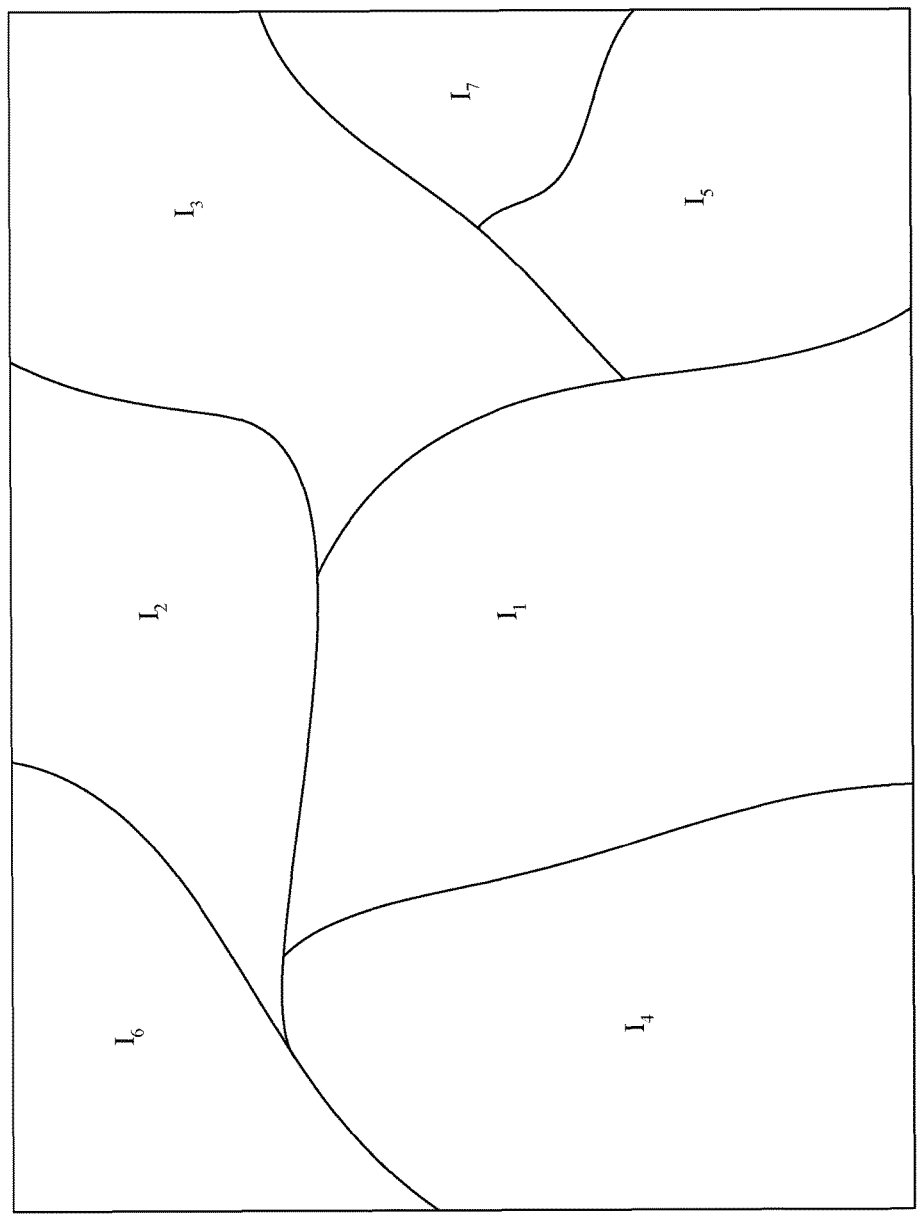
FIG. 4 is a simplified map for constructing an orthomosaic.

FIG. 4 shows a simplified example of an orthomosaic 375 that includes (in this case) seven regions which each include imagery from one of seven different images $I_1$, $I_2$, $I_3$, $I_4$, $I_5$, $I_6$, and $I_7$. One of the objectives and outputs of the orthomosaic processing is providing a "map" such as is shown in FIG. 4, so that the orthomosaic can be constructed from the various images.

Figure 5:
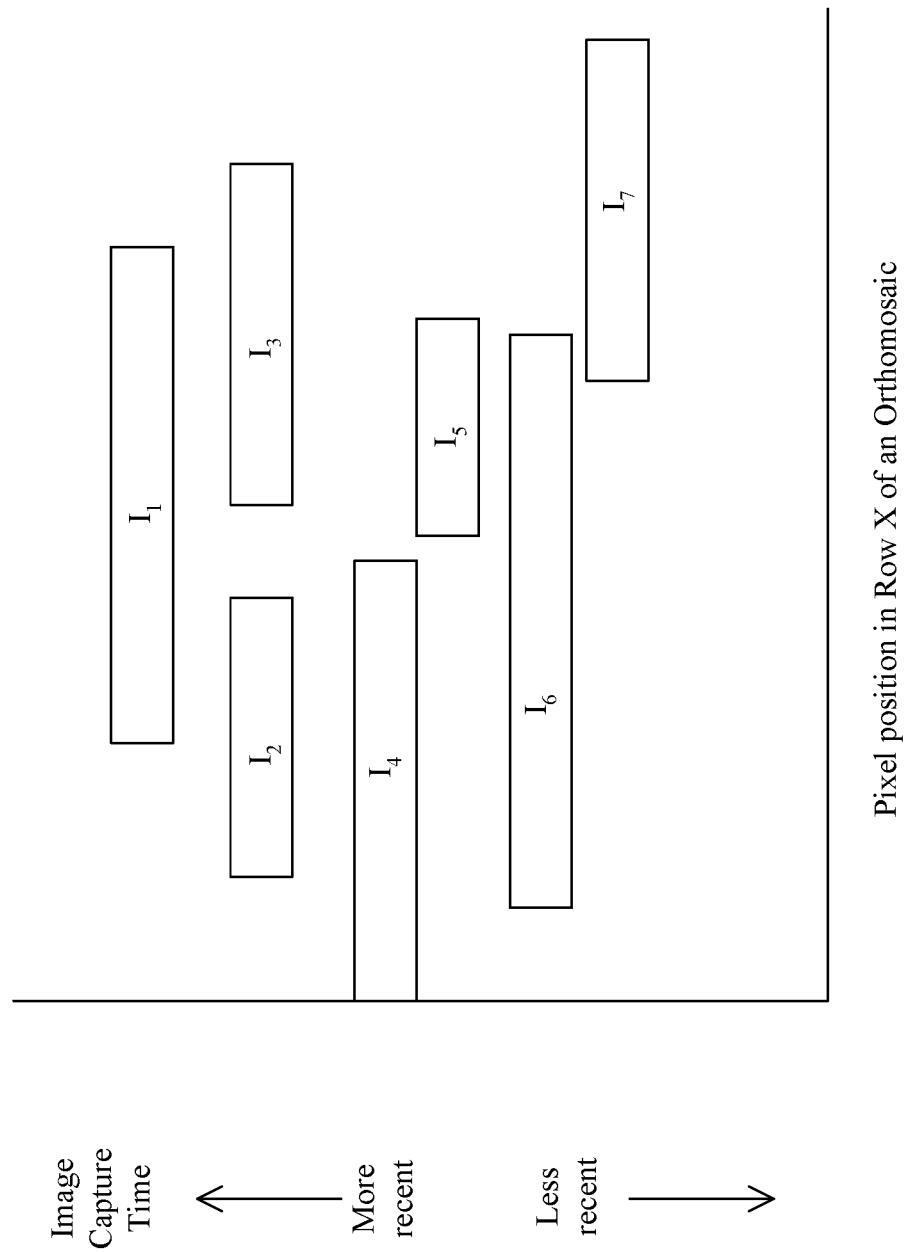
FIG. 5 is an illustration of images ranked by image capture time and plotted versus pixel position in a given row of an orthomosaic.

FIG. 5 shows, for a given row (Row X) of an orthomosaic, the various images $I_1$, $I_2$, $I_3$, $I_4$, $I_5$, $I_6$, and $I_7$, that are available for use in forming the orthomosaic. In this case, the $I_1$, $I_2$, $I_3$, $I_4$, $I_5$, $I_6$, and $I_7$ of FIG. 5 are not related to the $I_1$, $I_2$, $I_3$, $I_4$, $I_5$, $I_6$, and $I_7$ of FIG. 4.

Figure 6:
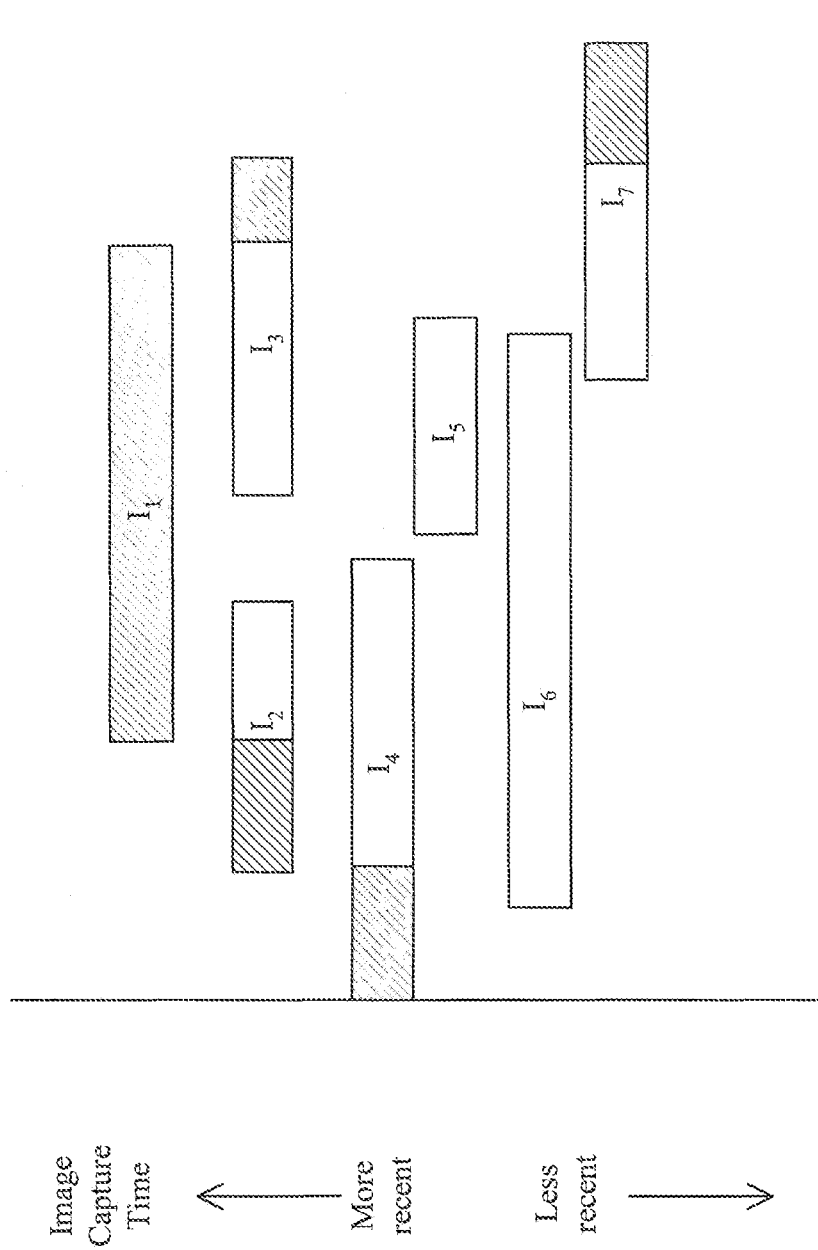
FIG. 6 is an illustration of images ranked by image capture time and plotted versus pixel position in a given row of an orthomosaic, and showing those images that would be retrieved with the database discussed herein.
Figure 7:
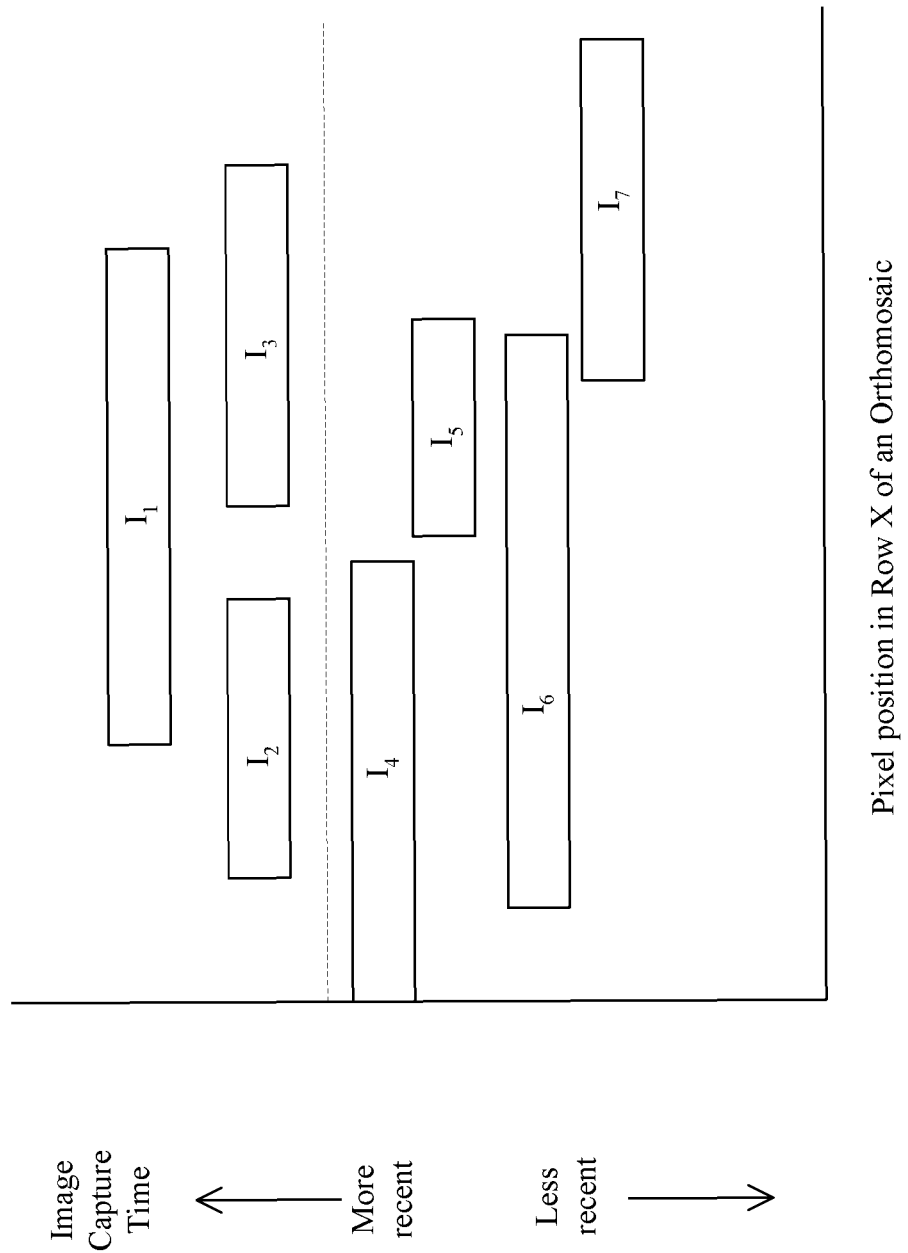
FIG. 7 is an illustration of images ranked by image capture time and plotted versus pixel position in a given row of an orthomosaic, and showing those portions of various images that would be retrieved with a typical database.

FIG. 6 shows the portions of $I_1$, $I_2$, $I_3$, $I_4$, $I_5$, $I_6$, and $I_7$ that are used in forming an orthomosaic using the rule that the most recent imagery is used whenever possible. The portions that are used are illustrated as cross-hatched. Note that no portion of $I_5$ and $I_6$ are used. This is very achievable with the HMDS database structure described herein. By way of comparison, a typical Postgres database could not easily achieve this. Instead, a Postgres database would instead respond to queries such as "provide all images more recent than Time Y." In such case, the Postgres database would in many cases provide more than one image for a given pixel position (see FIG. 7), which would not be desirable. Alternatively, it will not return any image at all for a given pixel position in another case. It is important to observe that there is no value of Y that would provide the desired result. The dashed line in FIG. 7 represents the Time Y, and the images above the dashed line are what would be returned.

Figure 8:
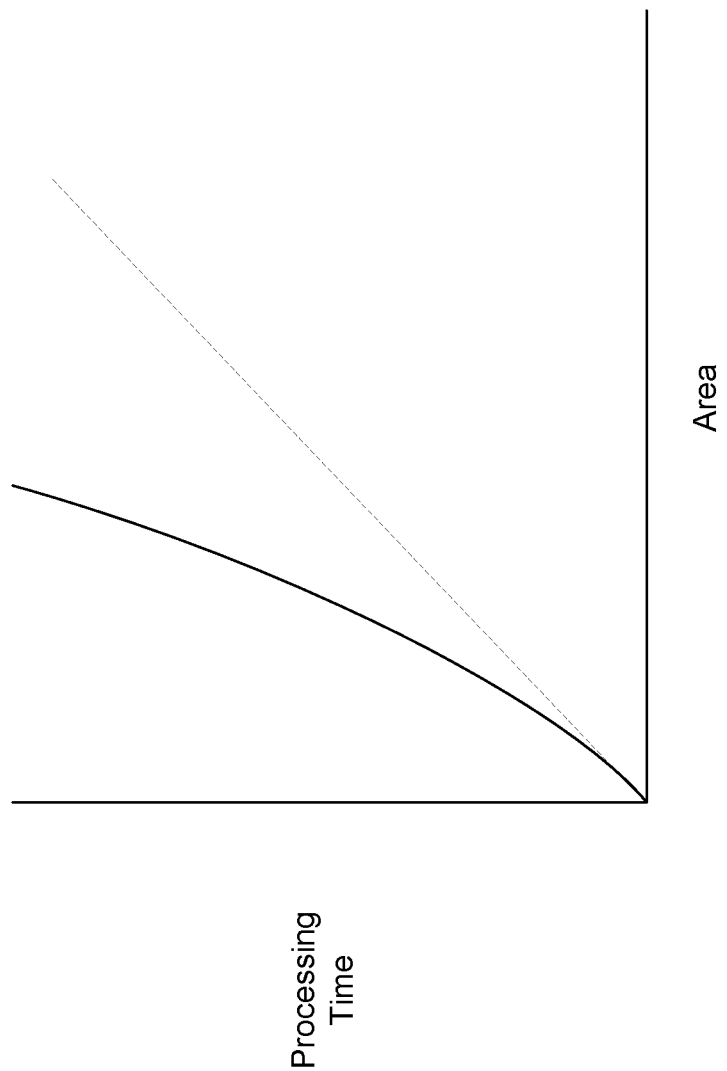
FIG. 8 is a graph generally representing the superlinear relationship between area and processing time for creating an orthomosaic.
Figure 9:
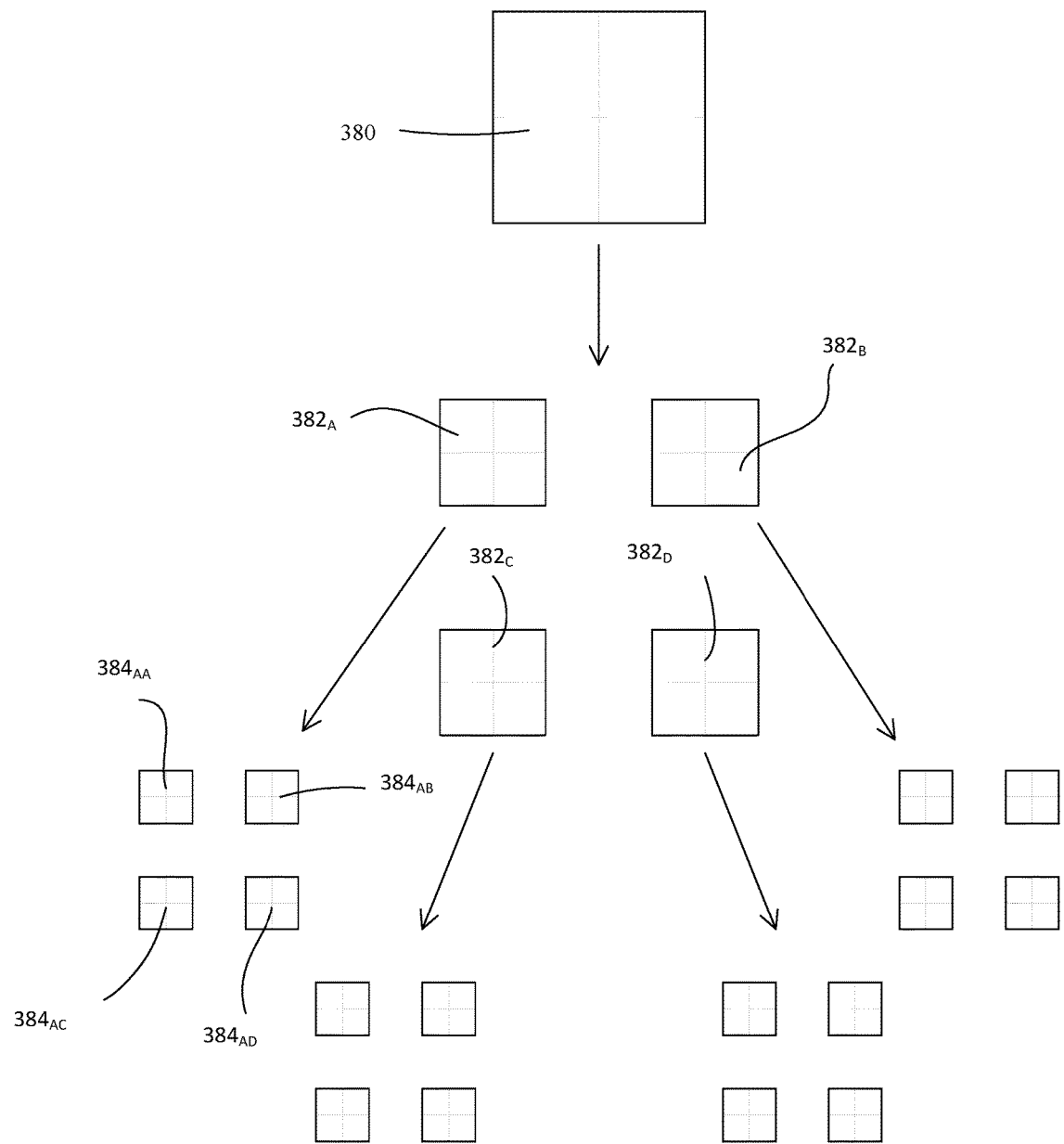
FIG. 9 is an illustration of the breaking up of the orthomosaic into smaller chunks for more efficient processing.

As FIG. 8 shows, the relationship between the area of an orthomosaic and the processing time required to create the orthomosaic grows super-linearly. This is due to the geometric operations required to form the orthomosaic polygons from the original image polygons, which are known to grow super-linearly with size. Based in part on recognizing that, that it became desirable to be able to minimize the area of an orthomosaic to be processed. Another feature of the HMDS database is that it breaks the processing up into more manageable chunks for more efficient processing, as is illustrated in FIG. 9, and then merging together the results for each chunk into the final result. An orthomosaic 380 is shown, which can be partitioned in four chunks $382_A$, $382_B$, $382_C$, and $382_D$. Each of the chunks $382_A$, $382_B$, $382_C$, and $382_D$ can be broken down into four smaller junks (e.g., $382_A$ can be broken down into $384_{AA}$, $384_{AB}$, $384_{AC}$, and $384_{AD}$, and so on). This process of breaking down into smaller chunks can be done as many times as needed, and the number of smaller chunks it is broken down into can be any number, with four being but one example.

Disclosed herein is a service-oriented architecture for orthomosaic processing. It should be understood that the specific architecture and processing disclosed herein are but one example of possible implementations. Services may be unassociated, loosely coupled units of functionality that are self-contained. Each service may implement at least one action. A service consumer may send a service request to a service provider. In response, the service provider may provide a service response back to the service consumer. The various service providers and service consumers could be on the same or any combination of different computers.

Figure 10:
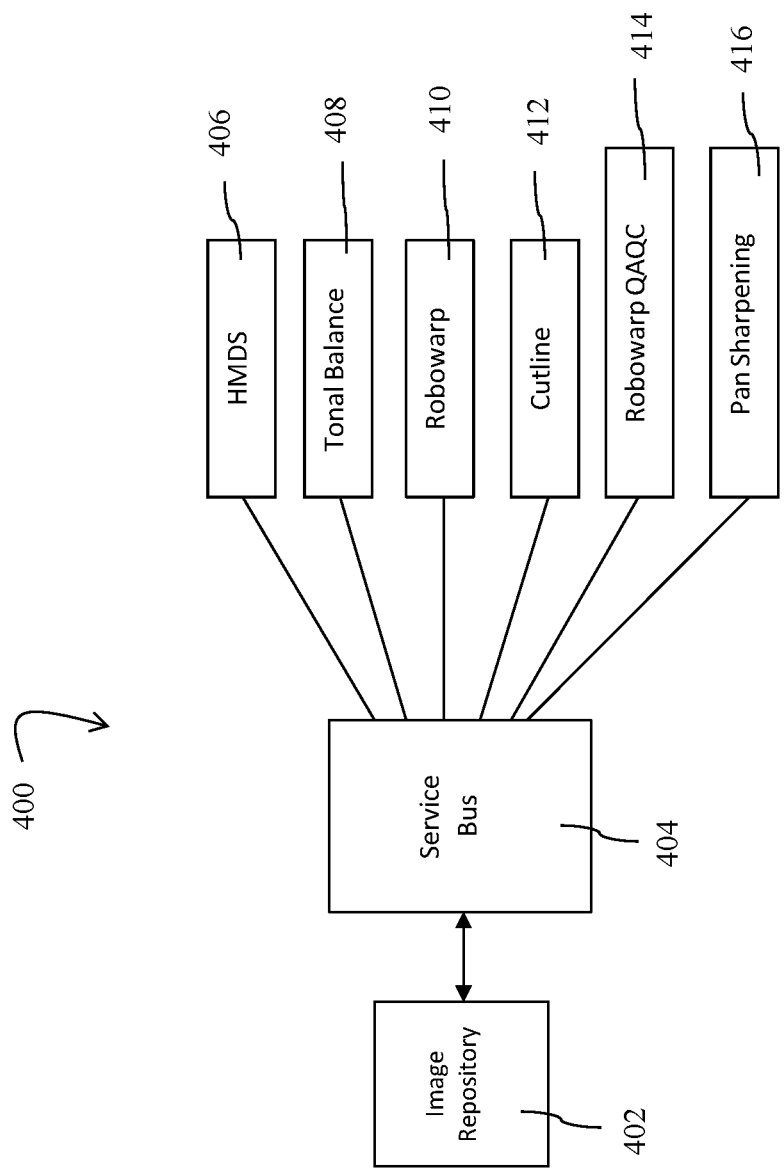
FIG. 10 is a general representation of the services used in generating the orthomosaic.

For example, a system 400 is shown in FIG. 10 that includes an image repository 402 that may store a plurality of images, and which may include any type of memory/storage suitable for storing a plurality of images. The image repository 402 is in communication with a service bus 404 that facilitates and enables interaction between a plurality of services. These services can include, for example, a Hierarchical Mosaic Data Structure (HMDS) 406 which largely controls the formation of orthomosaics by the system 400. The services may also include a tonal balance service 408 (to improve the quality of the mosaic), a warping service 410 (in this case a particular type of warping known as Robowarp), a cutline service 412, a Robowarp Quality Assurance and Quality Control (QA QC) service 414, and a pan sharpening service 416. With an architecture such as this, each service 406-416 only needs to be configured to interact with the service bus 404, rather than be configured for each to work directly with each other. This can simplify things when additional services are added and/or when a service is replaced with another service, such as an off-the-shelf service.

More specifically, Hierarchical Mosaic Data Structure (HMDS) is a software package that allows for automated mosaic generation. For example, a set of GEOTIFF images can be ingested into the mosaic data structure. This gives a baseline from which HMDS can generate mosaics from imagery at given times. After the creation of the initial data structure, additional images can be ingested into the mosaic. A new image can be a single image, or multiple overlapping or adjacent images (components). Each such image can have some or all of the pan(-sharpened) and/or MSI bands ingested.

Figure 12:
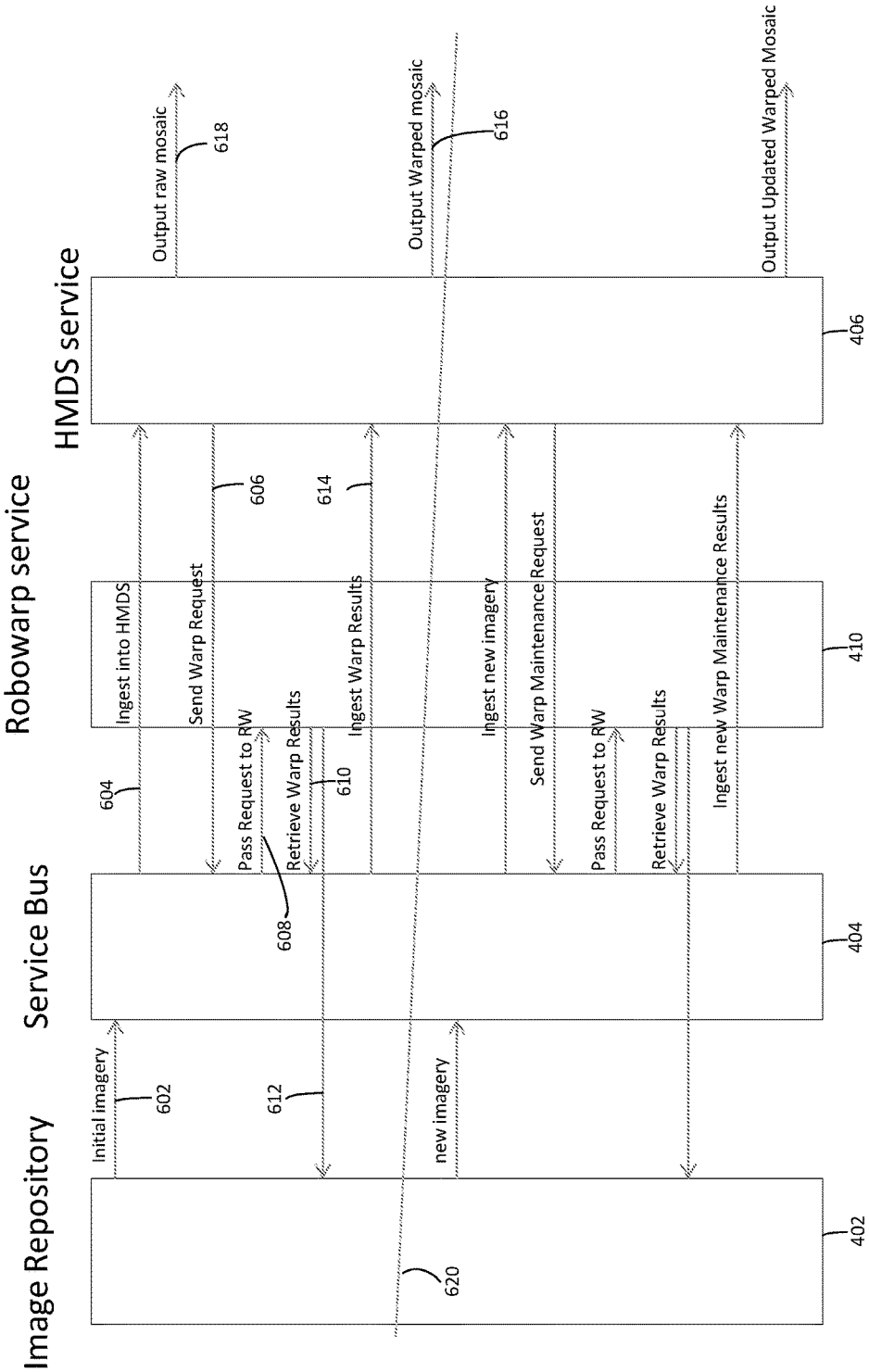
FIG. 12 is a general representation of the warping processing.

After ingestion, files can be requested to be warped via some warping function that is external to HMDS. HMDS will output a text file of files that need to be warped, and then the new warped files can be ingested to replace the raw imagery for the mosaic data. As is shown in FIG. 12, initial imagery is passed (602) from the image repository 402 to the service bus 404. The imagery is then ingested (604) into the HMDS service 406. The HMDS service 406 may send (606) a warp request to the service bus 404. The service bus 404 passes (608) the request to the Robowarp service 410. The service bus 404 later retrieves (610) the warp results from the Robowarp service 410. Optionally, the warp results may also be passed back to the image repository 612. The warp results are ingested (614) into the HMDS service 406, and then a warped mosaic is outputted (616). Further details on warp maintenance is provided in FIG. 6 below the dashed line 620.

HMDS also supports functionality for pan-sharpening. If the pan and MSI bands are ingested, a request can be generated for part or all of the mosaic at a given time to be pan-sharpened via some external pan-sharpening service. Once the pan-sharpened files are created, they can be ingested into HMDS and subsequently outputted as a mosaic.

Figure 11:
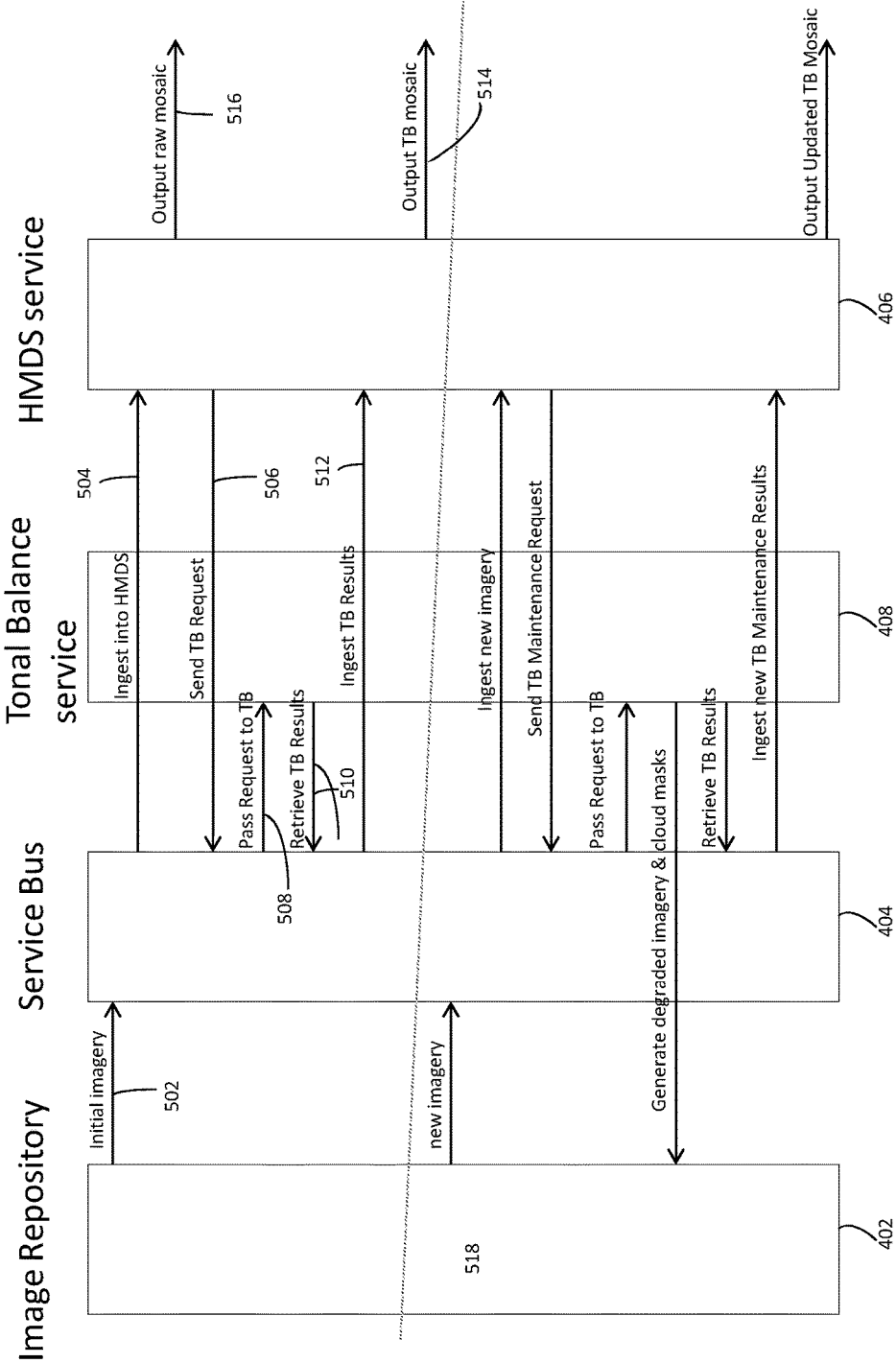
FIG. 11 is a general representation of the tonal balance processing.

HMDS also supports tonal balancing capabilities. A request for tonal balance values (atmospheric correction, gain, and bias) for a given region in the mosaic at a given time can be made and values can be generated via some external tonal-balancing service. The values then can be read, and HMDS can then generate a tonally-balanced mosaic for the region and time. This is shown in FIG. 11 in which initial imagery is passed (502) from the image repository 402 to the service bus 404. The imagery is then ingested (504) into the HMDS service 406. In order to obtain tonal balancing, the HMDS service 406 sends (506) a request for tonal balance to the service bus 404. The service bus 404 passes (508) the request to the tonal balance service 408. The service bus 404 then retrieves (510) the tonal balance results from the tonal balance service 408. Then, the tonal balance results are ingested (512) into the HMDS service 406 and the HMDS service outputs (514) a tonal-balanced mosaic. It is also an option for the HMDS service 406 to output (516) a raw mosaic without tonal balancing. Further details on tonal balance maintenance are shown in FIG. 11 below the dashed line 518.

HMDS also supports user-defined cutlines for ingested images (via some cutline service), both as pair-wise cutlines between images, and as pre-constructed polygons. The shapefiles are read in along with the ingested files, and the boundaries will be reflected in resulting mosaics. Past imagery that has been already ingested can also be updated (i.e. older mosaic that require different cutlines) using the warp ingestion capabilities, where the old and new "warps" point to the same files, and the new cutlines are passed in. It is recommended that a state of HDMS be saved and restored prior to this usage to retain the cutlines for the most current imagery.

Finally, HMDS can output a mosaic. This can either be a subset of the mosaic region, in which the output will consist of either overlapping or non-overlapping tiles with user-defined world coordinate width and height. Otherwise, the entire mosaic region can be outputted. The mosaic can either be constructed from the most recent imagery ingested, or it can be constructed from imagery up to a given point in time. This allows one to see mosaics of a region at earlier points in time.

HMDS allows for null pixels along the boundary of images (induced by warping), which will be trimmed off.

Figure 13:
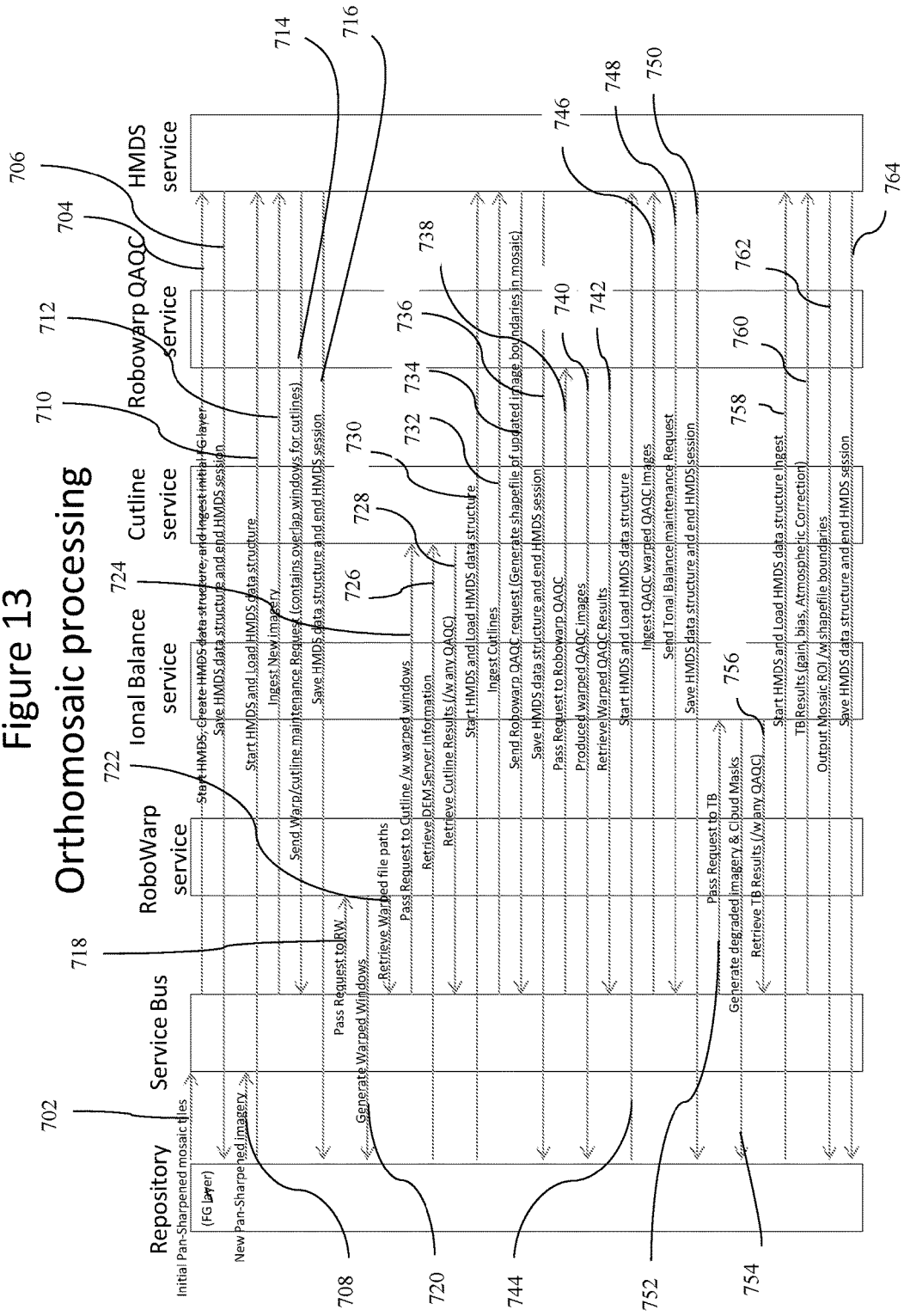
FIG. 13 is a general representation of the orthomosaic processing.
Figure 14:
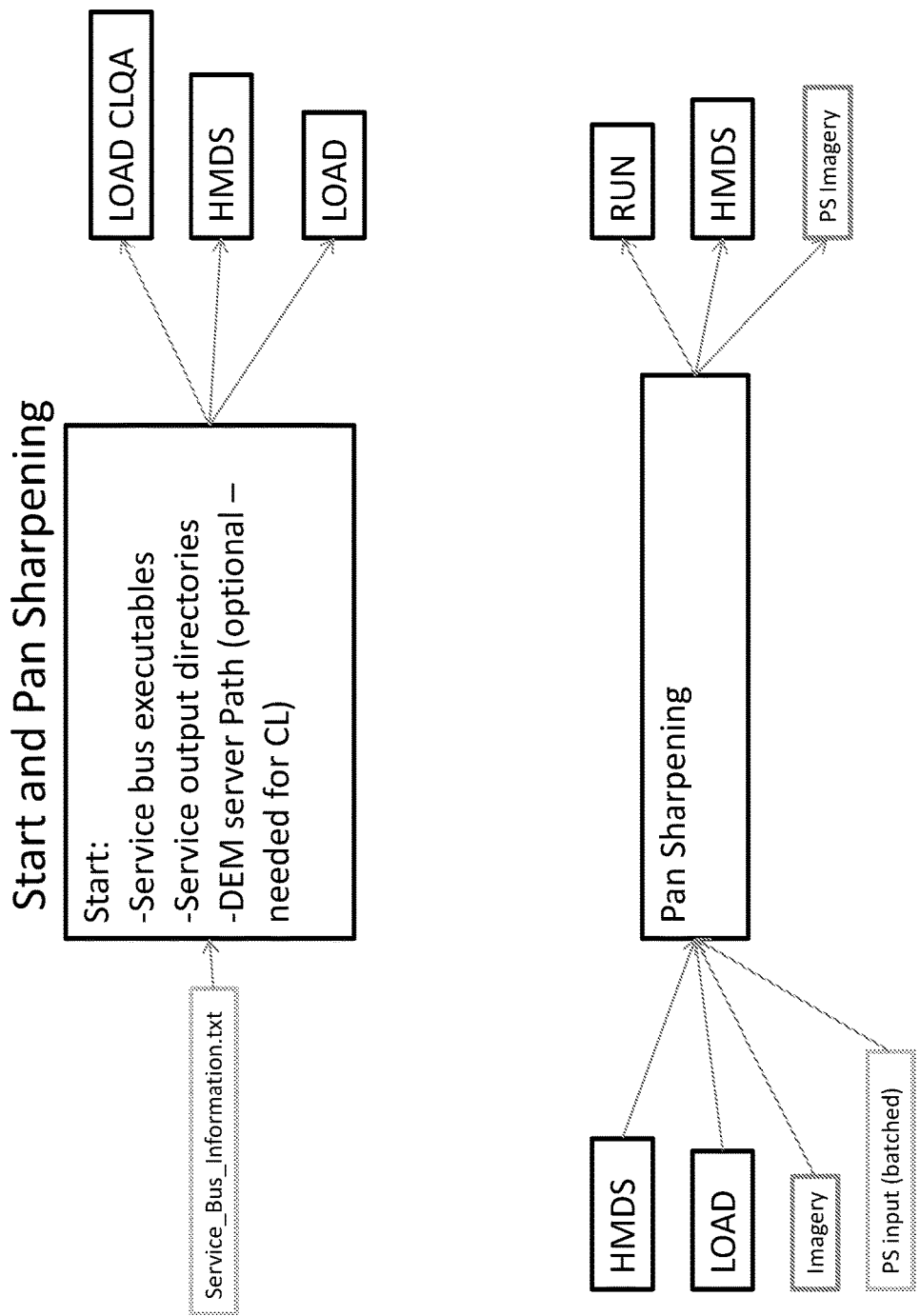
FIG. 14 is a general representation of the pan sharpening processing.
Figure 15:
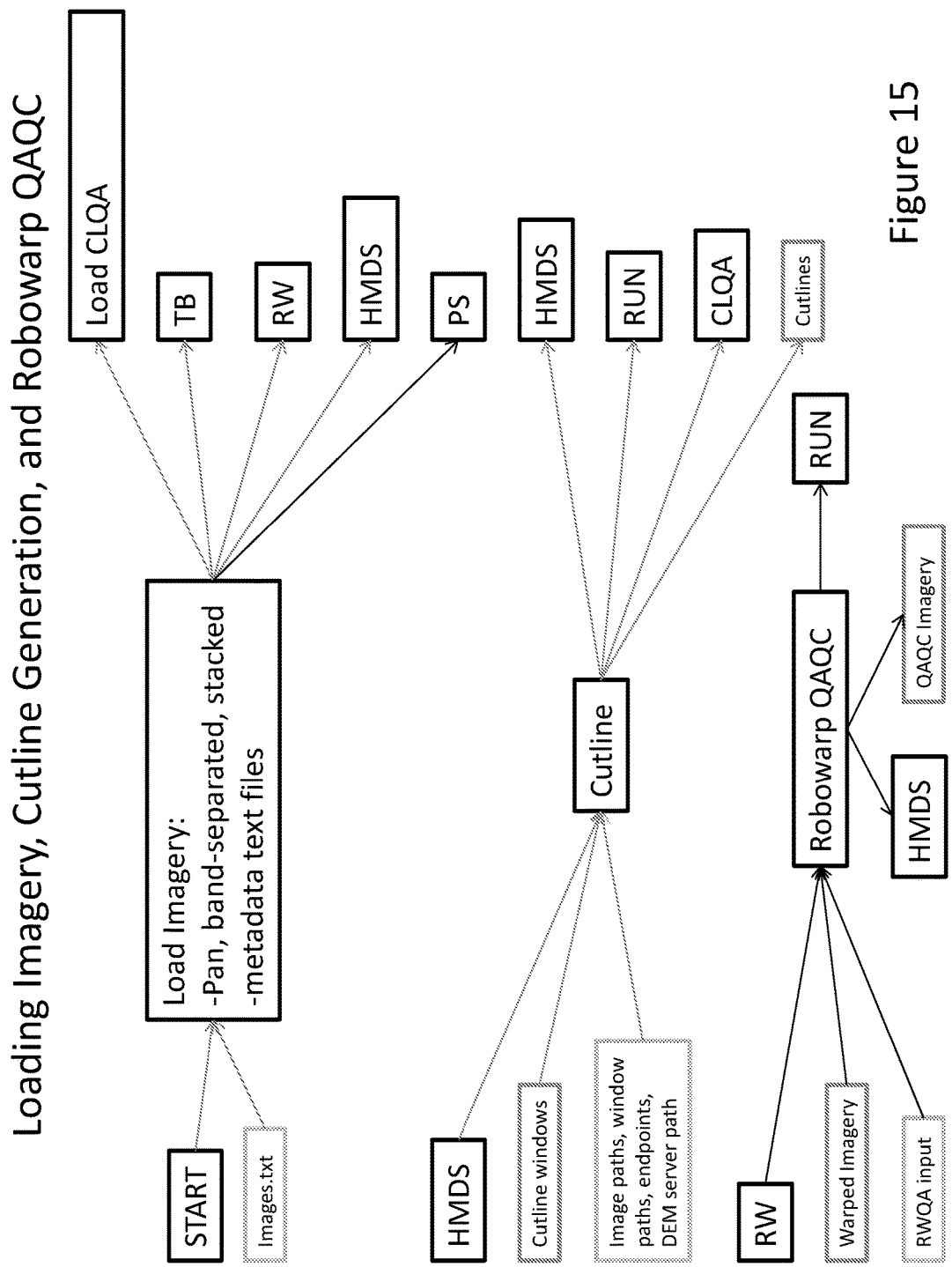
FIG. 15 is a general representation of the loading imagery, cutline generation, and Robowarp QAQC processing.
Figure 16:
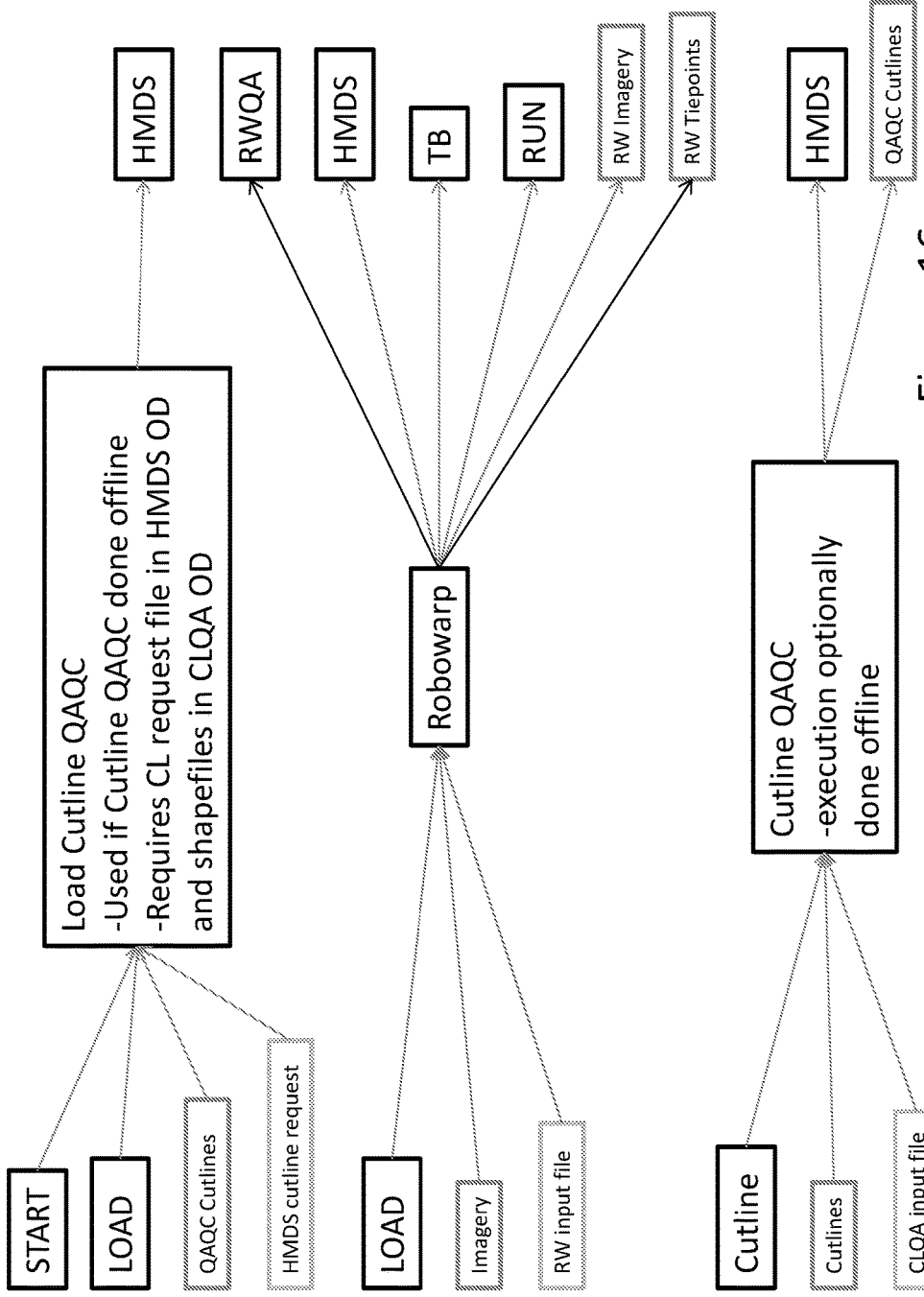
FIG. 16 is a general representation of the loading cutline QAQC results, Robowarp, and cutline QAQC processing.
Figure 17:
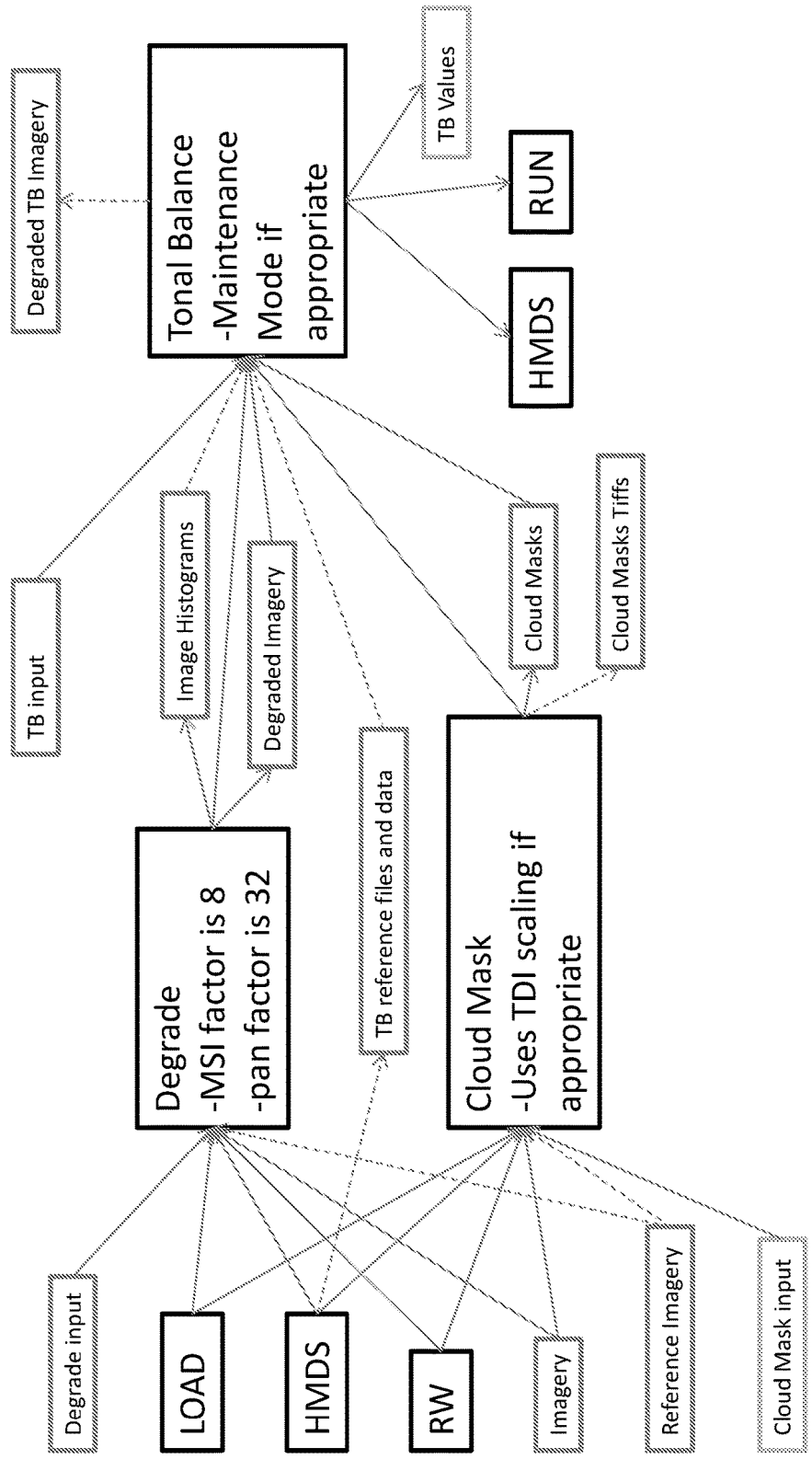
FIG. 17 is a general representation of tonal balancing, with degrade and cloud mask generation processing.
Figure 18:
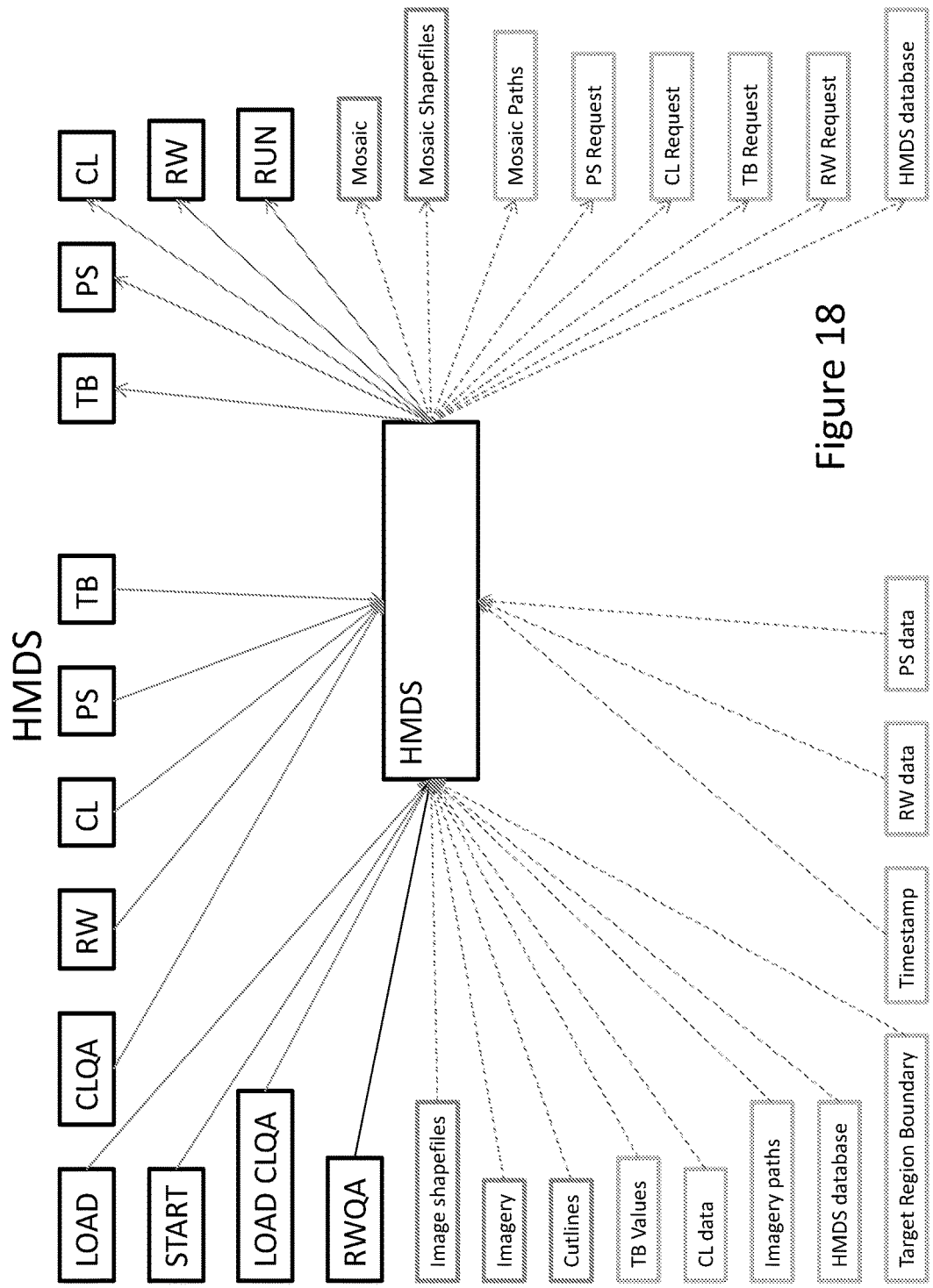
FIG. 18 is a general representation of the HMDS processing.

As is shown in FIG. 13, an initial pan-sharpened mosaic tile is provided (702) from the image repository 402 to the service bus 404. Then the HMDS is started, the HMDS data structure is created, and the initial image layer is ingested (704) into the HMDS service 406. The HMDS data structure is saved and the HMDS session ended (706). Subsequently, new pan-sharpened imagery is provided (708) from the image repository 402 to the service bus 404. The HMDS is started and the HMDS data structure is loaded (710). New imagery is ingested (712) by the HMDS service 406. The HMDS service 406 sends (714) a warp/cutline maintenance request (which may contain overlapping windows for cutlines) to the service bus 404. The HMDS data structure is saved and the HMDS session is ended (716). The request for RoboWarp is passed (718) from the service bus 404 to the RoboWarp service for 10. Warped windows are generated and returned (720) from the RoboWarp service 410 to the image repository 402. The warped file paths are retrieved (722) by the RoboWarp service 410 from the service bus 404. The request to the cutline service 412 is passed (724) by the service bus 404. The request may include the warped windows. DEM server information is retrieved (726) by the cutline service 412 from the results (with any QAQC) may be retrieved (728) by the service bus 404 from the cutline service 412. The HMDS is started and the HMDS data structure is loaded (730). The cutlines are ingested (732) by the HMDS service 406 from the service bus 404.

A RoboWarp QAQC request (generating the shape file of updated image boundaries in the mosaic) is sent (734) by the HMDS service 406 to the service bus 404. The HMDS data structure is saved and the HMDS session is ended (736). The request is passed (738) by the service bus 404 to the RoboWarp QAQC service 414. The warped QAQC images are produced (740) by the RoboWarp QAQC service 414 and provided to the image repository 402. The warped QAQC results are retrieved (742) from the RoboWarp QAQC service 414 by the service bus 404. The HMDS is started and the HMDS data structure is loaded (744). The warped QAQC images are ingested (746) by the HMDS service 406. The HMDS service 406 sends (748) a tonal balance maintenance request to the service bus 404. The HMDS data structure is saved and the HMDS session is ended (750). The request is passed (752) by the service bus 404 to the tonal balance service 408. Degraded imagery and cloud masks are generated (754) by the tonal balance service 408. Tonal balance results (with any QAQC) are retrieved (756) by the service bus 404 from the tonal balance service 408. The HMDS is started and the HMDS data structure is loaded (758). The tonal balance results (which may include such things as gain, bias, and atmospheric correction) is ingested (760) by the HMDS service 406. An output mosaic region of interest (ROI) (with shape file boundaries) is provided (762) by the HMDS service 406 to the image repository 402. The HMDS data structure is saved and the HMDS session is ended (764).

FIGS. 14-18 show further detail about the various services, what inputs they receive, and what other services they provide imagery/data/information/requests to.

At this point, methods and techniques for performing such computer-implemented methods will be discussed. Generally, the techniques disclosed herein may be implemented on any suitable hardware or any suitable combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Figure 2:
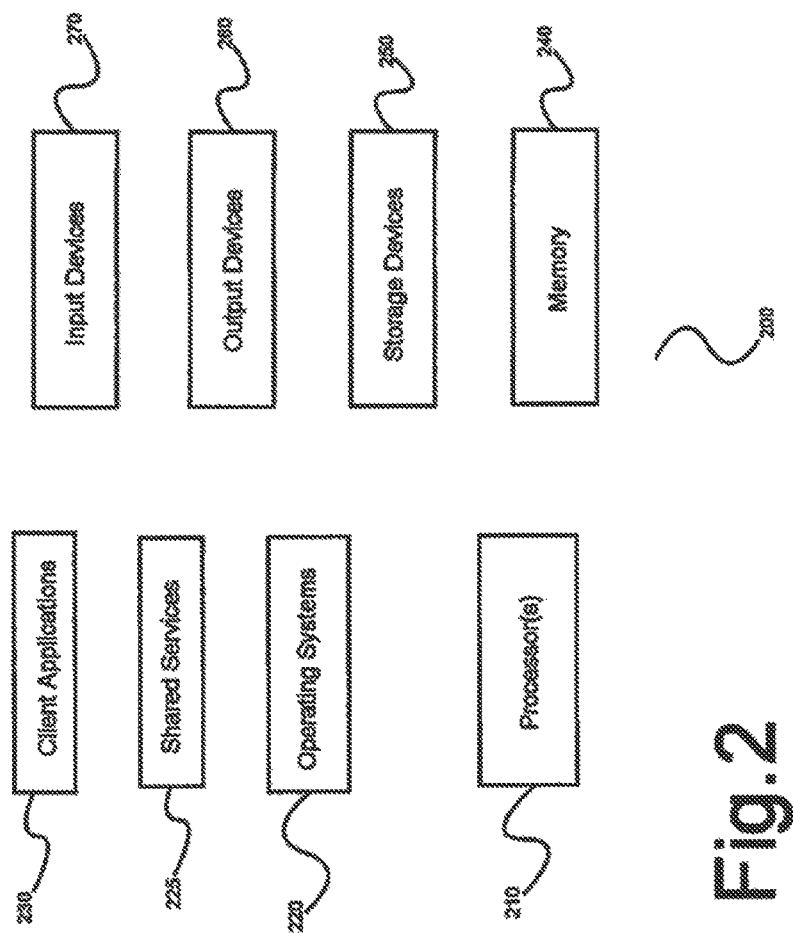
FIG. 2 is a block diagram illustrating an exemplary logical architecture for a client device, according to an embodiment of the disclosure herein.

Referring now to FIG. 2, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface (s) 110.

In at least one embodiment, CPU 102 may be caused to perform one or more of the different types of functions and/or operations under the control of software modules or components, which for example, may include an operating system and any appropriate applications software, drivers, and the like. CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 2 illustrates one specific architecture for a computing device 100 for implementing one or more of the embodiments described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system that includes a client device (such as a tablet device or smartphone running client software) and server systems (such as a server system described in more detail below).

Regardless of network device configuration, the system may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 3:
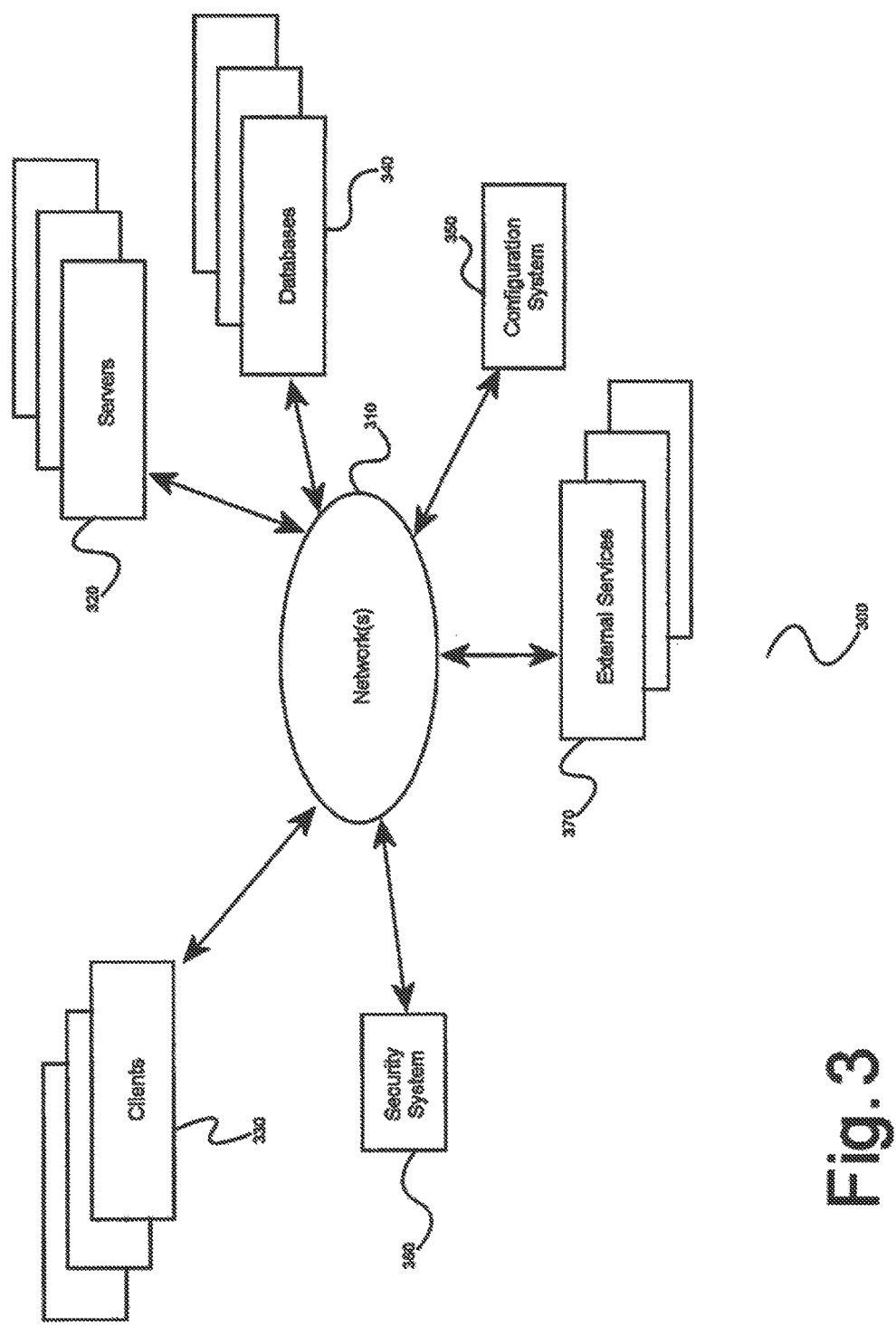
FIG. 3 is a block diagram illustrating an exemplary architectural arrangement of clients, servers, and external services, according to an embodiment of the disclosure herein.

In some embodiments, systems may be implemented on a standalone computing system. Referring now to FIG. 3, there is shown a block diagram depicting a typical exemplary architecture of one or more embodiments or components thereof on a standalone computing system. Computing device 200 includes processors 210 that may run software that carry out one or more functions or applications of embodiments, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

In some embodiments, systems may be implemented on a distributed computing network, such as one having any number of clients and/or servers. Referring now to FIG. 4, there is shown a block diagram depicting an exemplary architecture for implementing at least a portion of a system according to an embodiment on a distributed computing network. According to the embodiment, any number of clients 330 may be provided. Each client 330 may run software for implementing client-side portions of the embodiments and clients may comprise a system 200 such as that illustrated in FIG. 3. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; no one network topology is preferred over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments, clients 330 or servers 320 (or both) may make use of one or more specialized services or appliances that may be deployed locally or remotely across one or more networks 310. For example, one or more databases 340 may be used or referred to by one or more embodiments. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 360 or configuration system 350 or approach is specifically required by the description of any specific embodiment.

In various embodiments, functionality for implementing systems or methods may be distributed among any number of client and/or server components. For example, various software modules may be implemented for performing various functions, and such modules can be variously implemented to run on server and/or client components.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

While this specification contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

We claim:

1. A system for automatically generating orthomosaic images, comprising:
    an image storage repository; and
    a processor operating on computer instructions to implement a plurality of separate services and a service bus to pass requests and data between at least two of the plurality of services, wherein the plurality of services include at least a mosaic generation service, a cutline service, and a tonal balancing service;
    wherein the mosaic generation service communicates with the service bus to obtain images from the repository, communicates with the service bus to request and obtains from the service bus cutlines from the cutline service, communicates with the service bus to request and obtains from the service bus tonal balancing results from the tonal balancing service, and generates an orthomosaic image from the images, cutlines, and tonal balancing results obtained from the service bus.

2. A system as defined in claim 1, wherein the services also include an image warping service.

3. A system as defined in claim 1, further including a user interface that allows a user to provide feedback to the system about the orthomosaic image being generated.

4. A system as defined in claim 1, wherein the image storage repository includes a plurality of images captured at different times, so that each image has a capture time associated therewith;
    wherein the services further include a database that divides up the orthomosaic image to be generated into a plurality of subimages which are each processed separately, and wherein the database selects image data that has the most recent capture time when available for a given portion of the orthomosaic image, and when not available for a given portion of the orthomosaic image, the database selects image data that has the next most recent capture time.

5. A system as defined in claim 1, wherein generating the orthomosaic image includes creating a map of which image to use to provide the image data for each pixel in the orthomosaic.

6. A system as defined in claim 5, wherein the map is created in part by using a rule of using the most recent imagery where possible.

7. A system for automatically generating orthomosaic images, comprising:
    an image storage repository; and
    a processor operating on computer instructions to implement a plurality of separate services and a service bus to pass requests and data between at least two of the plurality of services, wherein the plurality of services include at least a mosaic generation service, a cutline service, and a tonal balancing service;
    wherein the mosaic generation service communicates with the service bus to obtain images from the repository, communicates with the service bus to request and obtains from the service bus cutlines from the cutline service, communicates with the service bus to request and obtains from the service bus tonal balancing results from the tonal balancing service, and generates an orthomosaic image from the images, cutlines, and tonal balancing results obtained from the service bus;

wherein the image storage repository includes a plurality of images captured at different times, so that each image has a capture time associated therewith;

wherein the services further include a database that divides up the orthomosaic image to be generated into a plurality of subimages which are each processed separately, and wherein the database selects image data that has the most recent capture time when available for a given portion of the orthomosaic image, and when not available for a given portion of the orthomosaic image, the database selects image data that has the next most recent capture time.

8. A system as defined in claim 7, wherein the services also include an image warping service.

9. A system as defined in claim 7, further including a user interface that allows a user to provide feedback to the system about the orthomosaic image being generated.

10. A system as defined in claim 7, wherein generating the orthomosaic image includes creating a map of which image to use to provide the image data for each pixel in the orthomosaic.

11. A system as defined in claim 10, wherein the map is created in part by using a rule of using the most recent imagery where possible.

12. A system for automatically generating orthomosaic images, comprising:

an image storage repository;

a processor operating on computer instructions to implement a plurality of separate services and a service bus to pass requests and data between at least two of the plurality of services, wherein the plurality of services include at least a mosaic generation service, a cutline service, a tonal balancing service, and an image warping service;

a user interface that allows a user to provide feedback to the system about the orthomosaic image being generated;

wherein the mosaic generation service communicates with the service bus to obtain images from the repository, communicates with the service bus to request and obtains from the service bus cutlines from the cutline service, communicates with the service bus to request and obtains from the service bus tonal balancing results from the tonal balancing service, and generates an orthomosaic image from the images, cutlines, and tonal balancing results obtained from the service bus;

wherein the image storage repository includes a plurality of images captured at different times, so that each image has a capture time associated therewith;

wherein the services further include a database that divides up the orthomosaic image to be generated into a plurality of subimages which are each processed separately, and wherein the database selects image data that has the most recent capture time when available for a given portion of the orthomosaic image, and when not available for a given portion of the orthomosaic image, the database selects image data that has the next most recent capture time.

13. A system as defined in claim 12, wherein generating the orthomosaic image includes creating a map of which image to use to provide the image data for each pixel in the orthomosaic.

14. A system as defined in claim 13, wherein the map is created in part by using a rule of using the most recent imagery where possible.

* * * * *